J. STEPHENSON.
Brake for Horse Railroad Cars.
No. 87,122.  Patented Feb. 23, 1869.
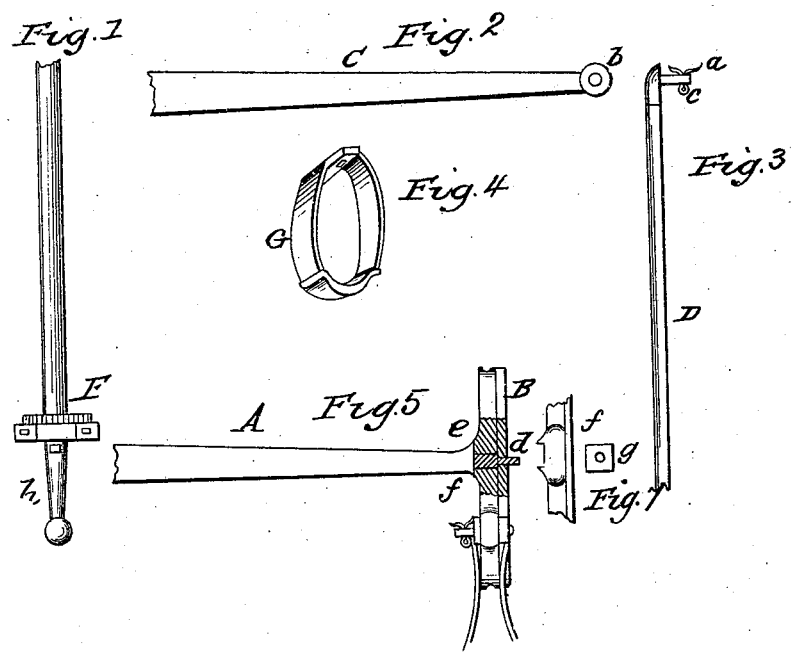
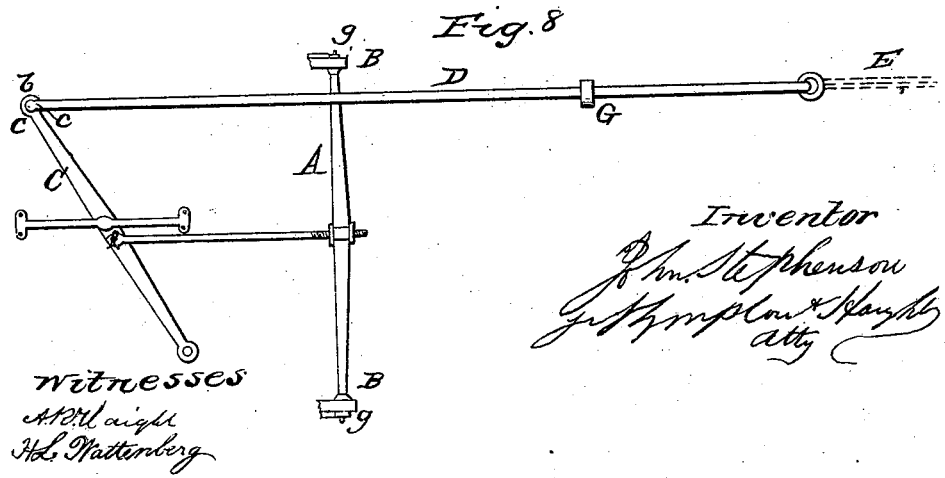

UNITED STATES PATENT OFFICE.

JOHN STEPHENSON, OF NEW YORK, N. Y.

IMPROVEMENT IN BRAKES FOR HORSE-RAILROAD CARS.

Specification forming part of Letters Patent No. 87,122, dated February 23, 1869.

*To all whom it may concern:*

Be it known that I, JOHN STEPHENSON, of the city, county, and State of New York, have invented a new and useful Improvement in Brakes for Street-Cars; and that the following description, taken in connection with accompanying drawings, hereinafter referred to, forms a full and exact specification of the same, wherein I have set forth the nature and principles of my said improvement, by which my invention may be distinguished from all others of a similar class, together with such parts as I claim and desire to have secured to me by Letters Patent.

This invention relates to a means for obviating the noise now occasioned by the motion of the reel-rod in its bearing.

In the accompanying sheet of drawings, Figure 1 is a detached view of the reel; Fig. 2, a detached view of a portion of the brake-lever; Fig. 3, a detached view of a portion of the reel-rod; Fig. 4, a detached perspective view of the elastic or flexible hanger; Fig. 5, a view of a portion of the brake-bar and a clog, partly in section; Fig. 6, an edge view of a portion of the clog; Fig. 7, a view of a nut; Fig. 8, a plan of the brake mechanism.

A represents the brake-bar of a street-car; B, one of the clogs thereof; C, the brake-lever; and D, the reel-rod, which is connected, at one end, by a chain, E, with the reel F. The reel-rod D is formed at one end with a pin, $a$, the latter projecting from the rod at right angles, and made out of the same piece of metal, or permanently connected thereto by welding, or other suitable means. The reel-rod D is connected to the brake-lever C by having one end of the latter enlarged to form a "boss," $b$, and this boss has a hole made through it to admit of the pin $a$ of the reel-rod passing through a key, $c$, passing through the pin, to prevent the casual slipping out of the latter.

By this arrangement a very strong and durable connection of the brake-lever and reel-rod is obtained, and without augmenting, in an appreciable degree, the cost of construction.

A loose pin, which is now used for connecting the reel-rod and brake-lever, is subjected to considerable wear, and after short use is liable to give way at any time. My improvement fully obviates this difficulty.

The brake-bar A I form at each end with a screw-tenon, $d$, and a square shoulder, $e$, the clogs B being made with a boss or enlargement, $f$, provided with a recess to receive the square shoulder $e$, the screw-tenon passing entirely through, and having a nut, $g$, on its outer end.

By this arrangement a very strong and durable connection of the brake-bar with the clogs is obtained, and the casual detachment of said parts effectually prevented. This will be fully understood by referring to Figs. 5 and 8.

The shoulder $e$, fitting in the recess in the clog, constitutes the main feature of this part of the invention. For the reel-rod D I employ a hanger, G, of India rubber or other similar elastic material. This hanger admits of the working of the rod D without any appreciable noise. The ordinary rigid metallic hanger causes the rod D to work through it with a harsh, disagreeable, grating noise, which my improvement fully obviates. The lower part of the reel-rod D I make with a barrel, $h$, which gradually diminishes in diameter from its upper to its lower end, as shown clearly in Fig. 1. The chain E winds upon this barrel, and, in applying the brake, the chain is wound upon the barrel from the upper thick part of the same down to the lower and thin end.

By this arrangement I obtain speed in applying the brake at the commencement of the operation, when power may be advantageously dispensed with, and gradually diminish the speed and increase proportionally the power, as power is required, to wit, at the latter part of the operation.

Having thus described my invention, what I claim as new, and desire to secure by Letters Patent, is—

An elastic or flexible hanger or guide, G, for the reel-rod D, substantially as and for the purpose set forth.

JOHN STEPHENSON.

Witnesses:
LEANDER M. DE LAMATER,
JOHN A. TACKAHERN.